UNITED STATES PATENT OFFICE.

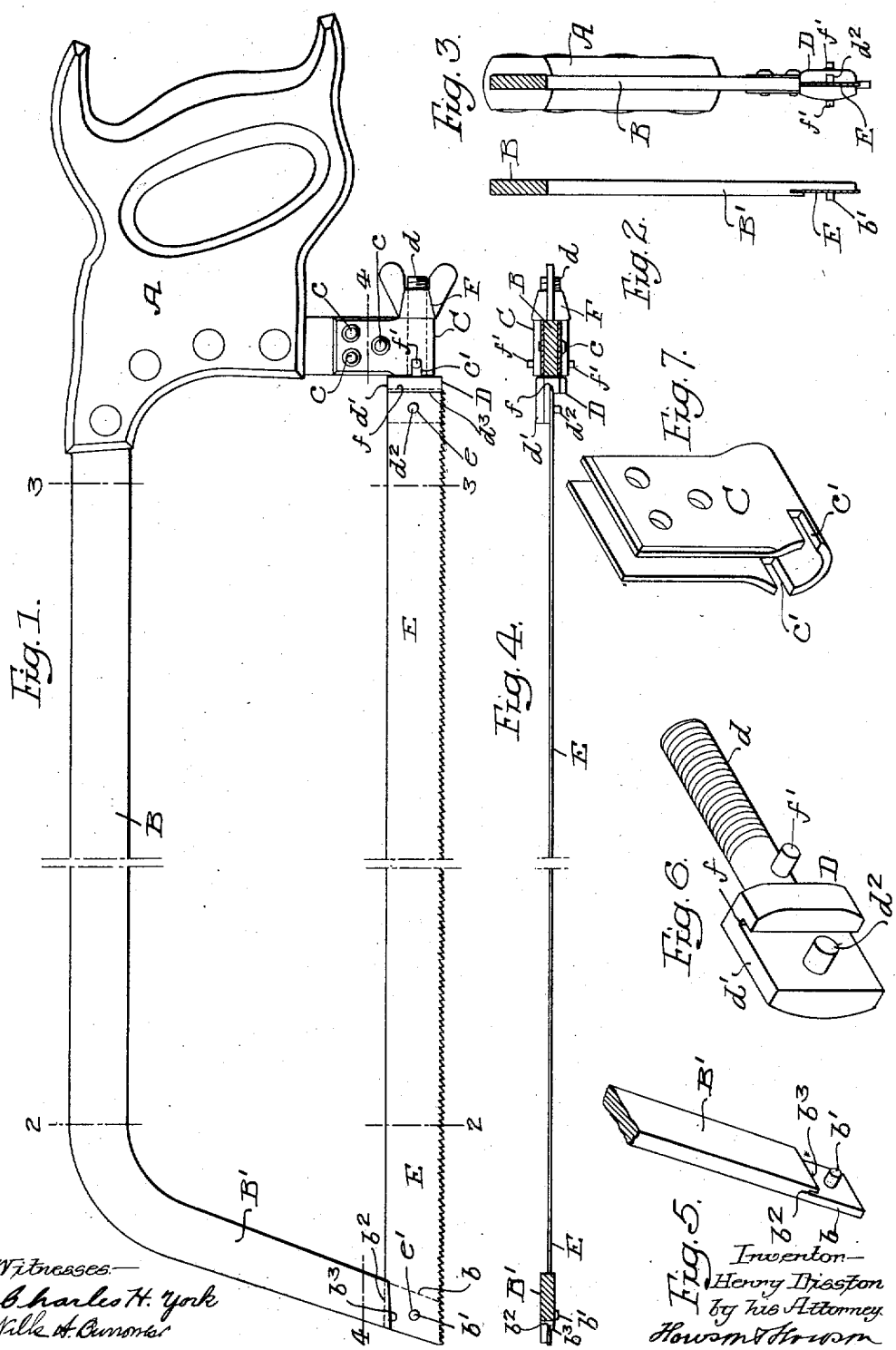

HENRY DISSTON, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

BUTCHER'S SAW.

1,120,457.  Specification of Letters Patent.  Patented Dec. 8, 1914.

Application filed November 30, 1912. Serial No. 734,323.

*To all whom it may concern:*

Be it known that I, HENRY DISSTON, a citizen of the United States, residing in Philadelphia, Pennsylvania, have invented certain Improvements in Butchers' Saws, of which the following is a specification.

One object of my invention is to improve the construction of butcher saws so that the blade of the saw will be rigidly held in position, thus preventing chattering.

A further object of the invention is to make the saw so that the blade can be readily detached from the back when it is desired to renew the blade.

While the invention is particularly adapted for butcher saws, it can be used in connection with a hack saw or any saw having an open back with a detachable blade.

In the accompanying drawing:—Figure 1, is a side view of my improved butcher saw; Fig. 2, is a sectional view on the line 2—2, Fig. 1; Fig. 3, is a sectional view on the line 3—3, Fig. 1; Fig. 4, is a sectional plan view on the line 4—4, Fig. 1; and Figs. 5, 6 and 7, are detached perspective views illustrating details of the invention.

A is the handle of the saw.

B is the back. The rear portion of this back is inserted in the slot in the handle and secured therein by ordinary bolts. The depending rear portion of the back extends below the handle and secured to this extension of the back, by rivets $c$, is a socket C through which passes the threaded stem $d$ of the rear attachment D. This rear attachment is made as clearly shown in Fig. 6, and has an extension $d'$ provided with a pin $d^2$ which passes through a hole $e$ in the rear end of the saw blade E. The attachment is slotted at $f$ for the reception of the extreme end of the blade which forms a tongue $d^3$, so that when the blade is in position the attachment holds it rigidly against any motion on the pin $d^2$ and prevents the blade from chattering when it is in use.

On the spindle $d$ of the attachment is a pin $f'$, which is adapted to slots $c'$ in the socket C, and on the end of the threaded spindle is a nut F by which the slack is taken up.

The outer end of the back B is bent, as shown in Fig. 1, forming a portion B', and at the extreme end of this portion B' is an extension $b$ less in width than the portion B', and projecting from one surface of this extension is a pin $b'$.

$b^2$ is a slot at the base of the extension into which projects the back of the saw blade E when the pin $b'$ is passed through the hole $e'$ in the blade, so that the blade is rigidly held by means of the tongue $b^3$ which extends over the face of the blade at the outer end.

When it is desired to substitute one blade for another, the nut is unscrewed and the attachment D loosened. The outer end of the saw blade E can be turned so as to withdraw it from under the tongue $b^3$ at the forward end and can be raised so as to withdraw it from under the tongue $d^3$ at the rear end. At the same time the blade is removed from the pins $d^2$ and $b'$.

In inserting a new blade the rear end of the blade is inserted under the tongue $d^3$ in the opening $f$ and passed over the pin $d^2$ and then the outer end of the blade is passed under the tongue $b^3$ and over the pin $b'$. The nut is then screwed up so as to place the desired tension on the blade, after which the saw is ready for use.

In this construction the attachment D need not be removed from the socket and the parts are not liable to be lost. One blade can be quickly substituted for another as soon as the edge of one blade becomes worn. Instead of riveting the socket C to the rear end of the back B, it may be welded or secured by other means, if so desired.

I claim:—

A saw comprising a blade and a back, said back being turned down at the end transverse to the saw and the lower end of the downturned portion being laterally cut-away throughout its width for a distance from the end less than the width of the saw blade, and the under portion of the shoulder formed by the cutting away of the downturned portion of the back being recessed in continuation of the surface formed by the cutting away to provide an opposing lip which overhangs the side of the saw blade, whereby the outer end of the saw blade is permitted to be engaged or disengaged by tilting on an axis longitudinally of the saw.

In testimony whereof, I have signed my name to this specification, in the presence of two subscribing witnesses.

HENRY DISSTON.

Witnesses:
E. B. ROBERTS,
W. C. BURKHOLDER.

Copies of this patent may be obtained for five cents each, by addressing the "Commissioner of Patents, Washington, D. C."